US009467935B2

(12) United States Patent
Yoshida

(10) Patent No.: US 9,467,935 B2
(45) Date of Patent: Oct. 11, 2016

(54) COMMUNICATION APPARATUS AND CONTROL METHOD THEREOF

(71) Applicant: CANON KABUSHIKI KAISHA, Tokyo (JP)

(72) Inventor: Masashi Yoshida, Miura-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/243,738

(22) Filed: Apr. 2, 2014

(65) Prior Publication Data

US 2014/0302847 A1 Oct. 9, 2014

(30) Foreign Application Priority Data

Apr. 3, 2013 (JP) .................................. 2013-077781

(51) Int. Cl.
*H04W 48/18* (2009.01)
*H04L 29/08* (2006.01)
*H04W 76/02* (2009.01)

(52) U.S. Cl.
CPC .............. *H04W 48/18* (2013.01); *H04L 67/16* (2013.01); *H04W 76/023* (2013.01)

(58) Field of Classification Search
CPC .... H04W 48/18; H04W 76/023; H04L 67/16
USPC .......................................... 455/435.1–435.3
See application file for complete search history.

(56) References Cited

U.S. PATENT DOCUMENTS

| 2003/0217168 | A1* | 11/2003 | Adachi et al. ................. 709/229 |
| 2007/0088951 | A1* | 4/2007 | Nakajima ..................... 713/171 |
| 2009/0116448 | A1* | 5/2009 | Nam et al. ..................... 370/331 |
| 2010/0178919 | A1* | 7/2010 | Deepak et al. ............ 455/435.2 |
| 2011/0281557 | A1* | 11/2011 | Choi et al. ..................... 455/411 |
| 2014/0016507 | A1* | 1/2014 | Han et al. ..................... 370/254 |
| 2014/0112301 | A1* | 4/2014 | Shu et al. ..................... 370/329 |
| 2014/0169210 | A1* | 6/2014 | Henry et al. .................. 370/253 |
| 2014/0274009 | A1* | 9/2014 | Do et al. ....................... 455/418 |
| 2014/0334446 | A1* | 11/2014 | Lim et al. ..................... 370/331 |
| 2014/0378172 | A1* | 12/2014 | Lim .............................. 455/458 |

FOREIGN PATENT DOCUMENTS

| CN | 1722688 A | 1/2006 |
| CN | 1953614 A | 4/2007 |
| CN | 104780531 A | 7/2015 |
| JP | 2009152689 A | 7/2009 |

* cited by examiner

*Primary Examiner* — Nathan Mitchell
(74) *Attorney, Agent, or Firm* — Canon U.S.A., Inc. IP Division

(57) ABSTRACT

A communication apparatus searches for an external apparatus prior to connecting to a wireless network, determines a service provided by the searched external apparatus, transmits a request, based on the determined service, and connects, when the request for utilizing the service is accepted, to the wireless network to establish communication with the external apparatus through the wireless network.

8 Claims, 7 Drawing Sheets

COMMUNICATION APPARATUS AND CONTROL METHOD THEREOF

BACKGROUND

1. Field

Aspects of the present invention generally relate to a technique for establishing communication with a predetermined external apparatus.

2. Description of the Related Art

With the spread of wireless communication, as discussed in Japanese Patent Application Laid-Open No. 2009-152689, a mobile terminal, such as a digital camera, is considered to transmit an image file by using a wireless communication function equipped therewith. As a general connection method, the following method can be considered. After connecting to a wireless network, the mobile terminal searches for a service in a network. When the service adapted to the mobile terminal is found, the mobile terminal is connected to the device providing the service. However, a service uniquely defined by a vendor other than a standard service defined by a communication standard may be searched as the service provided by the communication device. Thus, it is troublesome for a user to specify a service that can achieve a desired function among various services including the unique service of the vendor.

SUMMARY

According to an aspect of the present invention, a communication apparatus includes a connection unit configured to connect the communication apparatus to a wireless network, a search unit configured to search for an external apparatus prior to connecting to the wireless network by the connection unit, a determination unit configured to determine a service provided by the external apparatus searched for by the search unit, and a transmission unit configured to transmit a request to the searched external apparatus for utilizing the service of the external apparatus, wherein, if it is determined that an external apparatus to be communicated with provides a standard service and an extended service is provided, the transmission unit transmits a request to the external apparatus for utilizing the extended service, wherein, if it is determined that an external apparatus to be provided with provides the standard service but not the extended service, the transmission unit transmits a request to the external apparatus for utilizing the standard service, and wherein, when the request for utilizing the extended service or the standard service is accepted, the connection unit connects to the wireless network to establish communication with the external apparatus through the wireless network.

Further features of the present disclosure will become apparent from the following description of exemplary embodiments with reference to the attached drawings.

DESCRIPTION OF THE EMBODIMENTS

Various features and aspects of the exemplary embodiment(s) will be described in detail below with reference to the drawings.

An exemplary embodiment described below is an example as a realization unit of the present disclosure. The exemplary embodiment may be appropriately changed or modified according to configurations of apparatuses and various conditions to which the present disclosure is applied. Exemplary embodiments can also be appropriately combined.

In the present exemplary embodiment, an example using a wireless local area network (LAN) system compliant with the IEEE802.11 series will be described. However, a communication form is not limited to a wireless LAN compliant with the IEEE802.11.

<Configuration of Hardware>

Figure 1:
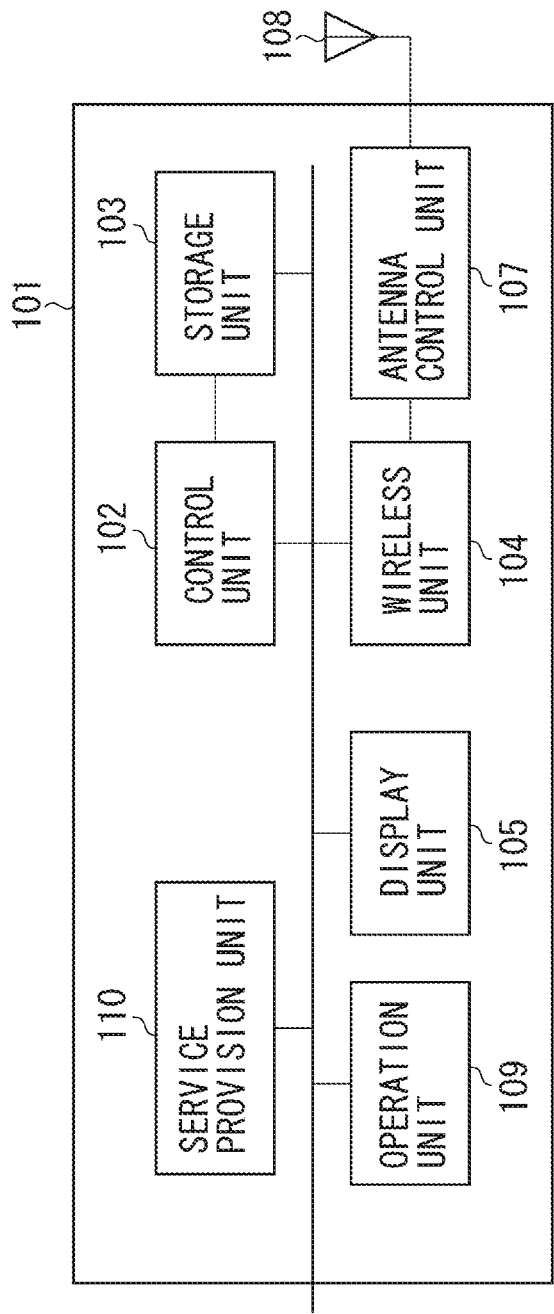
FIG. 1 is a block diagram illustrating a configuration of an apparatus according to a first exemplary embodiment.

FIG. 1 is a block diagram illustrating an example of a configuration of each apparatus, which is described below, according to a first exemplary embodiment. A communication apparatus 101 includes the following units. A control unit 102 executes a control program stored in a storage unit 103 to control the entire apparatus. The control unit 102 includes one or a plurality of processors, such as a central processing unit (CPU) and a micro processing unit (MPU). The control unit 102 also performs setting control for communication parameters between the communication apparatus 101 and another apparatus. The storage unit 103 stores the control program to be executed by the control unit 102 and various pieces of information, such as communication parameters. The storage unit 103 may store image data and files generated in the communication apparatus 101 or received from an external apparatus. The storage unit 103 includes various memories, such as a read only memory (ROM), a random access memory (RAM), a hard disk drive (HDD), and a flash memory. The control unit 102 executes the control program stored in the storage unit 103 so as to realize various operations, which are described below.

A wireless unit 104 enables the wireless LAN communication compliant with the IEEE 802.11 series. A display unit 105 performs various kinds of displaying. The display unit 105 includes, for example, a liquid crystal display (LCD) or a light emitting diode (LED), which can output visually recognizable information or a speaker that has a function to output sound. The display unit 105 has a function to output at least one of visual information and sound information.

The communication apparatus 101 further includes an antenna control unit 107 and an antenna 108. The antenna control unit 107 controls the antenna 108 to transmit and receive signals through wireless communication. An operation unit 109 allows a user to perform various inputs to operate the communication apparatus 101. The operation unit 109 includes various buttons and a touch panel.

A service provision unit 110 includes a function to provide a service of an application layer included in a communication device. In a case where the communication apparatus 101 is a printer, the service provision unit 110 provides a printing function. In a case where the communication apparatus 101 is a digital camera, the service provision unit 110 provides an imaging function and a file transmitting function.

The configuration illustrated in FIG. 1 is a mere example. The communication apparatus 101 may include a hardware configuration other than the hardware configuration illustrated in FIG. 1.

<Configuration of Software>

Figure 2:
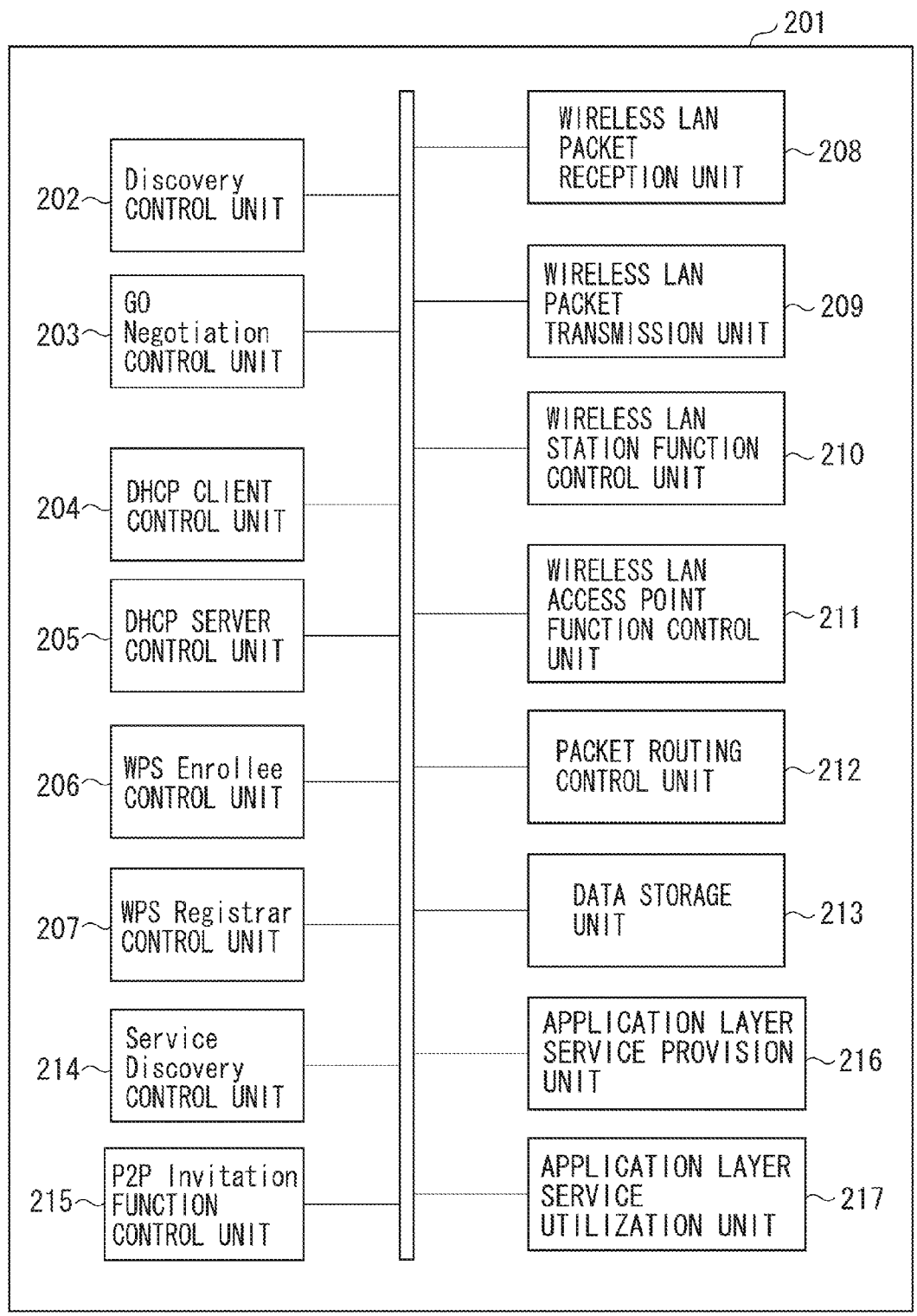
FIG. 2 is a block diagram illustrating a software configuration of the apparatus according to the first exemplary embodiment.

FIG. 2 is a block diagram illustrating an example of a configuration of a software functional block configured to execute a communication control function described below. A software functional block 201 includes the following units. A discovery control unit 202 controls search processing to search for a communication apparatus as a communication partner.

A GO negotiation control unit 203 performs control based on a Wi-Fi direct protocol specification to determine which communication apparatus becomes a wireless LAN access point or a wireless LAN station as a role between the communication apparatuses in a wireless layer. According to the Wi-Fi direct, a communication apparatus that executes a wireless LAN access point function is referred to as a P2P group owner (hereinafter, referred to as GO), and a communication apparatus that executes a wireless LAN station function is referred to as a P2P client (hereinafter, referred to as CL). In a case where the communication apparatus 101 becomes the GO or the wireless LAN access point, a wireless LAN access point function control unit 211 described below is activated. In a case where the communication apparatus 101 becomes the CL or the wireless LAN station, a wireless LAN station function control unit 210 described below is activated. The protocol of the GO negotiation is determined according to a Wi-Fi direct specification. Since this specification is well known, the detailed description thereof is omitted. According to the Wi-Fi direct, a network established by the GO is referred to as a P2P group. In the present exemplary embodiment, the network may be referred to as the P2P group and there is not specific difference between them.

In the present exemplary embodiment, the P2P group owner (GO), the P2P client (CL), and a communication apparatus group having an undetermined role are collectively referred to as a P2P device.

A DHCP client control unit 204 is activated when the role of the present communication apparatus is determined as the wireless LAN station by the GO negotiation control unit 203. A DHCP server control unit 205 is activated when the role of the communication apparatus 101 is determined as the wireless LAN access point by the GO negotiation control unit 203.

A WPS enrollee control unit 206 receives a communication parameter required for communication of wireless LAN from another WPS registrar apparatus. The WPS enrollee control unit 206 operates when the role of the present communication apparatus is the wireless LAN station as well as the DHCP client control unit 204. A WPS registrar control unit 207 provides a communication parameter required for communication of wireless LAN to another WPS enrollee apparatus. The WPS registrar control unit 207 operates when the role of the present communication apparatus is the wireless LAN access point as well as the DHCP server control unit 205. Examples of the communication parameters provided by the WPS registrar control unit 207 includes an SSID as a network identifier, an encryption key, an encryption method, an authentication key, and an authentication method.

A wireless LAN packet reception unit 208 and a wireless LAN packet transmission unit 209 receives and transmits all packets including a communication protocol of an upper layer. The wireless LAN station function control unit 210 executes authentication and encryption processing when the communication apparatus 101 is operated as the wireless LAN station, and the communication apparatus 101 participates in a wireless network established by the apparatus operated as the wireless LAN access point. The wireless LAN access point function control unit 211 establishes the wireless network when the communication apparatus 101 is operated as the wireless LAN access point function, and executes authentication and encryption processing and management of a communication partner apparatus. The functions of the wireless LAN station function control unit 210 and the wireless LAN access point function control unit 211 are operable singly or simultaneously.

A packet routing control unit 212 bridges and routes a communication packet during the operation of the wireless LAN access point function control unit 211. A data storage unit 213 stores and holds software itself, a wireless LAN parameter, and various tables, such as a DHCP address table and an ARP table.

A service discovery control unit 214 controls a service discovery function specific to the Wi-Fi direct. The service discovery function is for exchanging service information held by the communication partner apparatus by transmitting and receiving an action frame defined in the IEEE802.11u. More specifically, the service discovery function transmits an SD query and receives an SD response as an response. Alternatively, the service discovery function receives an SD query from the partner apparatus, and transmits an SD response as a response.

A P2P invitation function control unit 215 controls an invitation function defined in the Wi-Fi direct specification. Since the invitation function is defined in the Wi-Fi direct specification, the detailed description of the invitation function is omitted. The invitation function is a function performed by a GO device or a CL device for prompting a P2P device having an undetermined role to connect it to the wireless LAN as the P2P client.

An application layer service provision unit 216 provides a service of an application layer. The application layer herein is referred to as a service provision layer in an upper layer equal to or higher than a fifth layer in an OSI reference model. More specifically, for example, the application layer service provision unit 216 provides a printing function (printing service), an image streaming function (moving image streaming service), and a file transmitting function (file transmitting service).

An application layer service utilization apparatus 217 utilizes a service in the application layer provided by a service provision unit of an application layer of a partner apparatus. More specifically, the application layer service utilization apparatus 217 controls a function to transmit a print data to a printing service provision apparatus and a function to transmit a moving image to a digital display.

All the functional blocks illustrated in FIG. 2 are not limited to ones provided by software. At least a part thereof may be provided by hardware. The functional blocks illustrated in FIG. 2 have interrelation with each other. The functional blocks illustrated in FIG. 2 are mere examples. A plurality of functional blocks may constitute one functional block, or some of the functional blocks may be further divided into blocks that perform a plurality of functions.

In the present exemplary embodiment, the service in the application layer is realized by an apparatus configured to provide the service and an apparatus configured to utilize the service. In a case where the service in the application layer is a printing service, the service provision apparatus is a printer. The service provision apparatus receives printing data sent from a PC and performs printing. On the other hand, the service utilization apparatus is an apparatus, such as a PC. The service utilization apparatus generates printing data and transmits the printing data to the printer as the service provision apparatus. In a case where the service in the application layer is the file transmitting service, the service provision apparatus is a digital camera. The file transmitting service transmits the picked-up image data. On the other hand, the service utilization apparatus is a PC or an apparatus, such as a smartphone, which is a kind of a so-called mobile phone. The service utilization apparatus displays and stores the received image data.

<Outline of Connection Mode>

Figure 3:
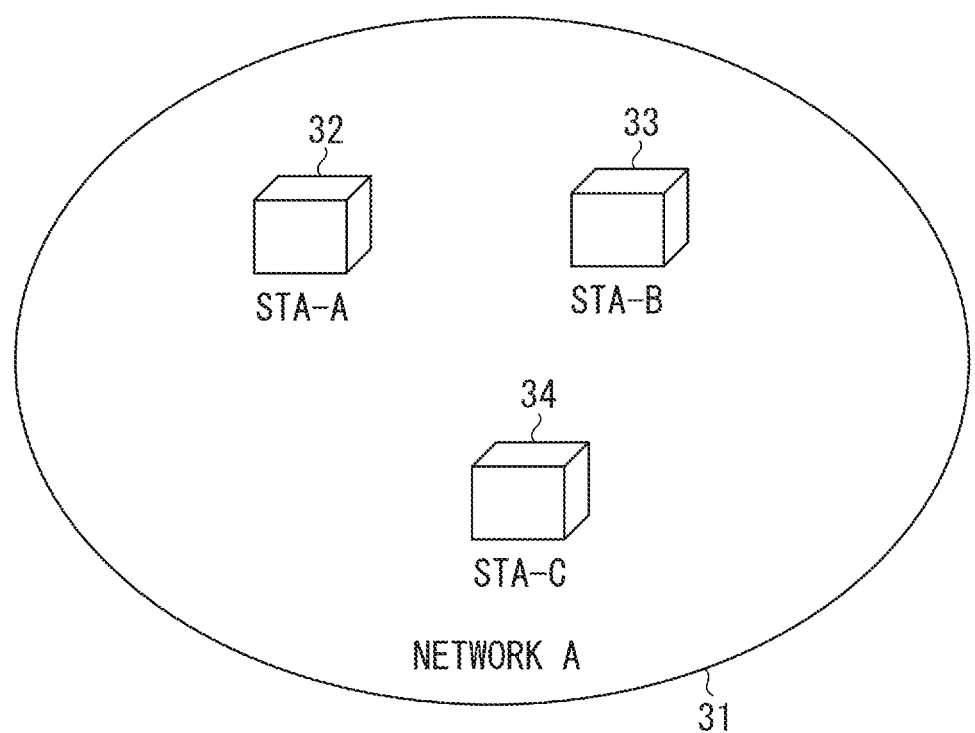
FIG. 3 is a diagram illustrating a network configuration according to the first exemplary embodiment.

FIG. 3 illustrates a communication apparatus A32 (hereinafter, referred to as STA-A), a communication apparatus B33 (hereinafter, referred to as STA-B), a communication apparatus C34 (hereinafter, referred to as STA-C), and a network A31 (hereinafter, referred to as network A) including the STA-A, the STA-B, and the STA-C. All these apparatuses have the configurations illustrated in FIGS. 1 and 2 described above.

<Device Connection Sequence>

In the present exemplary embodiment, it is presumed that a service for transmitting files, such as image data, is utilized. In the present exemplary embodiment, a standard file transmitting service (hereinafter, referred to as a standard service), which is defined in a predetermined communication specification and a vendor extended file transmitting service (hereinafter, referred to as an extended service), which is defined by a vendor, exist as the service for file transmitting. The extended service is a service specific to the vendor. For example, the extended service can transmit a plurality of image data at a time or enables division transmission, resizing transmission, and file transmission in a form that is not supported by the standard service. The extended service has a function extended to the standard service.

Figure 4A:
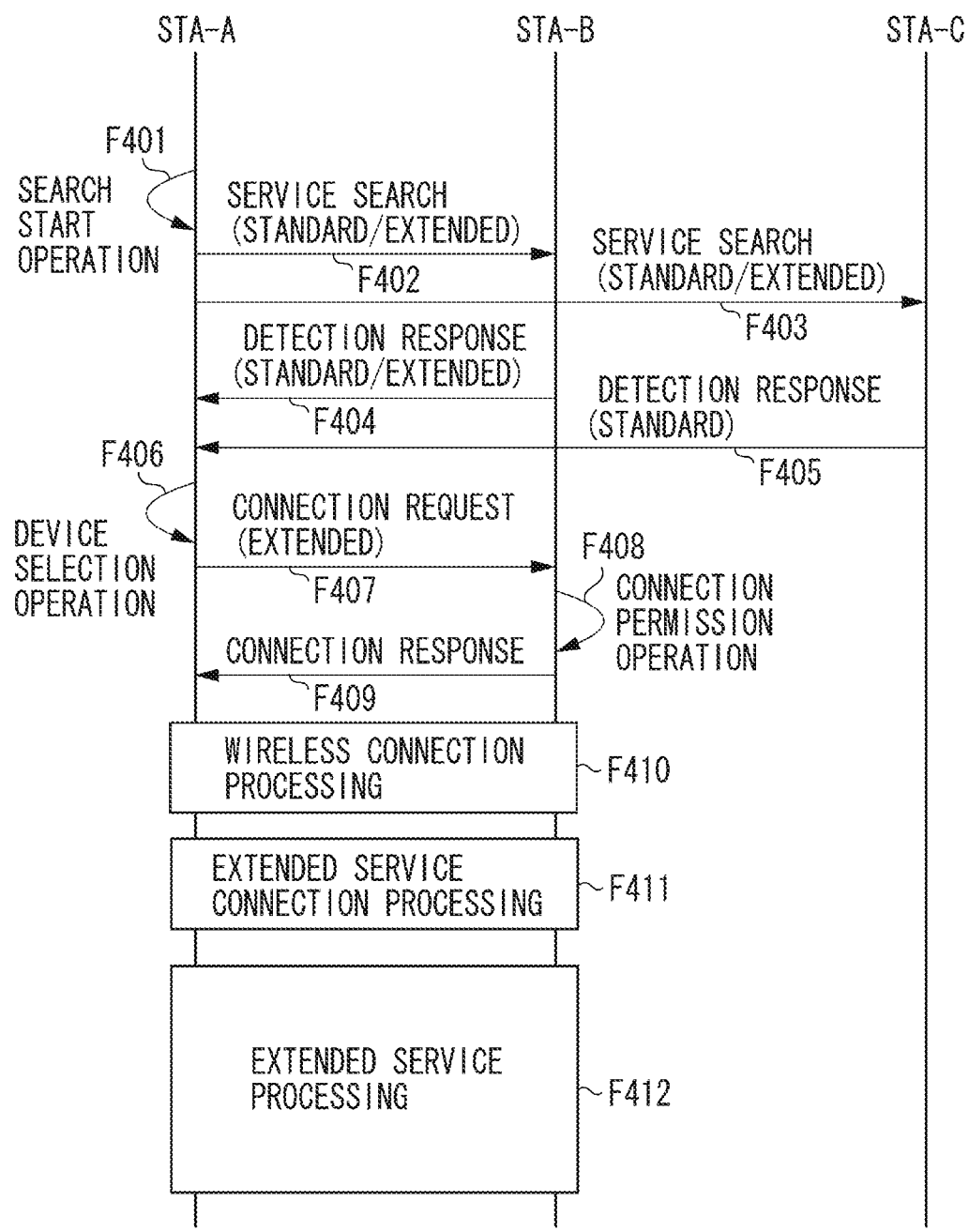
FIGS. 4A and 4B are sequence diagrams each illustrating processing of the apparatus according to the first exemplary embodiment.
Figure 4B:
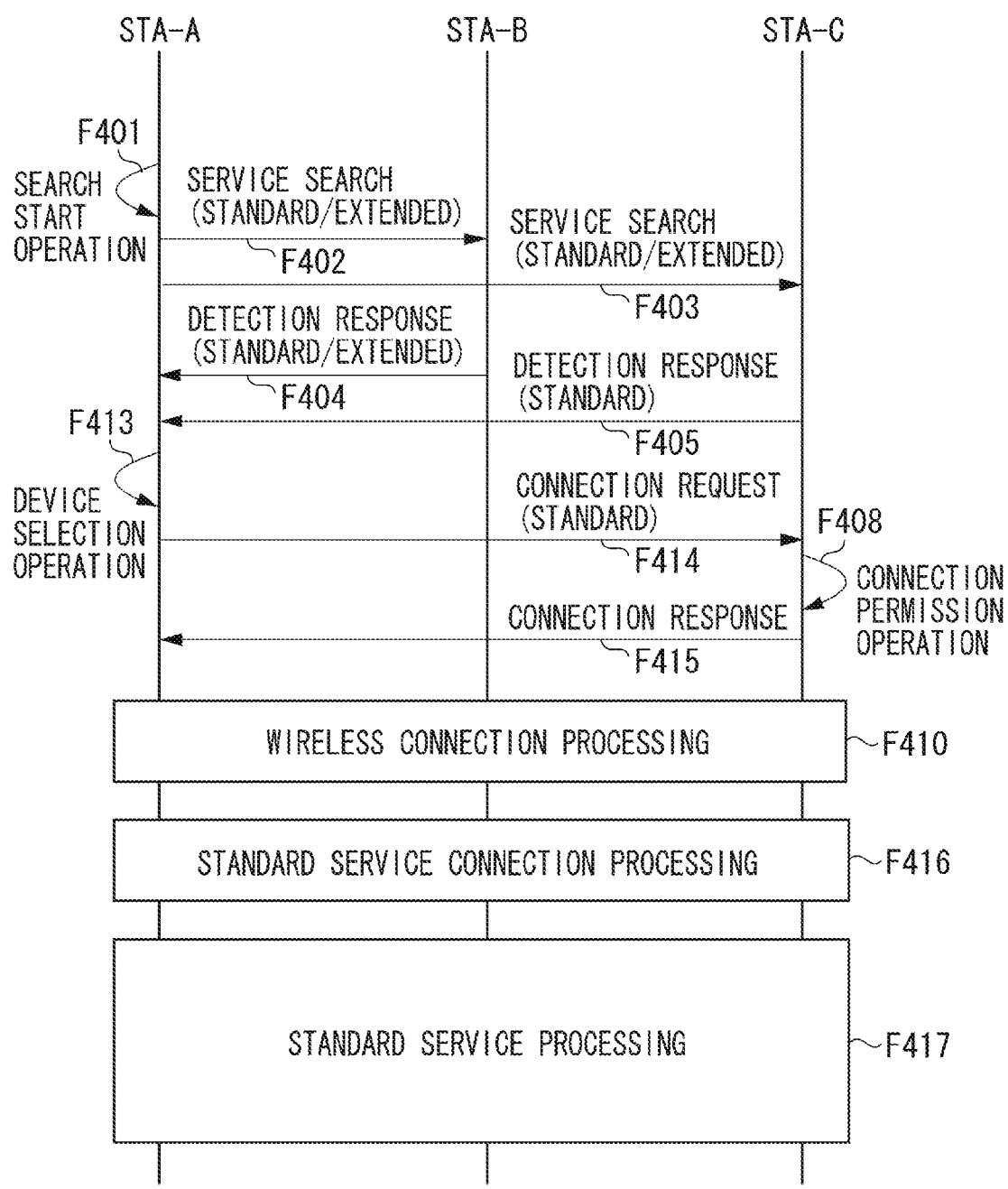

FIGS. 4A and 4B are sequence diagrams each illustrating an operation sequence between the apparatuses.

In examples of FIGS. 4A and 4B, the STA-A is the service utilization apparatus, and the STA-B and the STA-C each operates as the service provision apparatus. Unless otherwise stated, the service provision apparatuses STA-B and STA-C are already in a state capable of providing a service, and in a state capable of responding to a search from the service utilization apparatus STA-A.

The STA-A and the STA-B support both the standard service and the extended service. The STA-C supports only the standard service.

<Connection Between STA-A and STA-B>

First, an operation sequence when the STA-A is connected to the STA-B through the extended service is described with reference to FIG. 4A.

In step F401, the user operates the operation unit 109 of the service utilization apparatus STA-A to issue an instruction for the search start of the service provision apparatus. The instruction for the start of searching is issued by activating a specific application or executing a specific action. For example, in the case of the file transmitting service, the instruction of the start of searching is performed by activation of a file transmitting application, and an operation of a predetermined menu in various applications.

In steps F402 and F403, the STA-A transmits a query signal for searching for a communication apparatus to utilize the file transmitting service. The query signal includes a command for searching for a communication apparatus that provides at least one of the standard service and the extended service. Specifically, by including both information indicating the standard service and information indicating the extended service in an argument of one query signal, it is possible to search for both the services. A query signal for searching for the standard service and a query signal for searching for the extended service may be separately transmitted.

In steps F404 and F405, the STA-B and the STA-C, which have received the query signal, each transmit a search response signal to the STA-A. The STA-B transmits the search response signal indicating that the STA-B supports both the standard service and the extended service. On the other hand, the STA-C transmits the search response signal indicating that the STA-C supports the standard service.

Figure 6A:
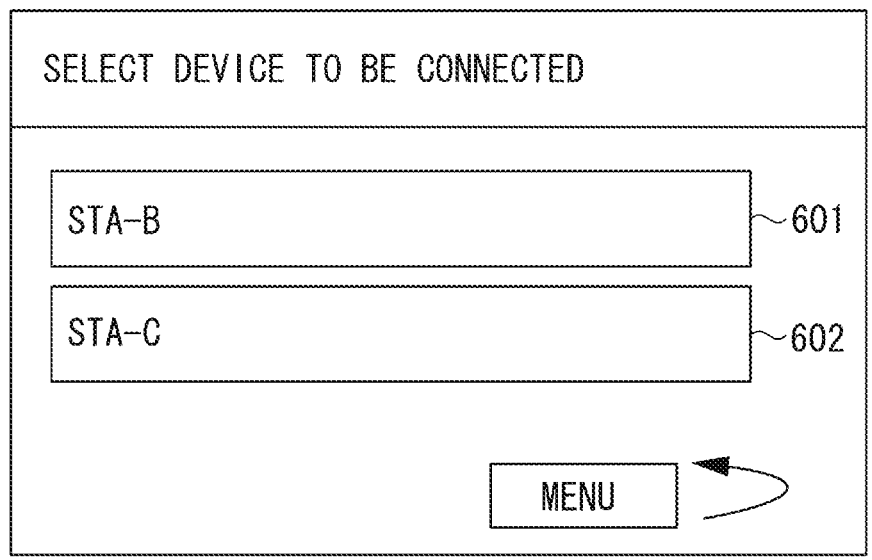
FIGS. 6A and 6B are display examples each illustrating a screen of the apparatus according to the first exemplary embodiment.

When the STA-A receives the search response signals, the STA-A displays a list of the apparatuses, which have transmitted the search response signal, on the display unit 105. A display example is illustrated in FIG. 6A. The STA-B (601) and the STA-C (602), which have transmitted the search response signal, are displayed on the display unit 105. In step F406, according to the operation sequence illustrated in FIG. 4A, the user operates the operation unit 109 to select the device STA-B (601) to be connected.

Since the STA-A and the STA-B support both the standard service and the extended service, the STA-A and the STA-B can be connected each other to both the standard service and the extended service. In step F407, the STA-A according to the present exemplary embodiment transmits a connection request in the extended service to the STA-B in such a case. This is because a higher function can be generally used in the extended service in many cases.

Figure 6B:
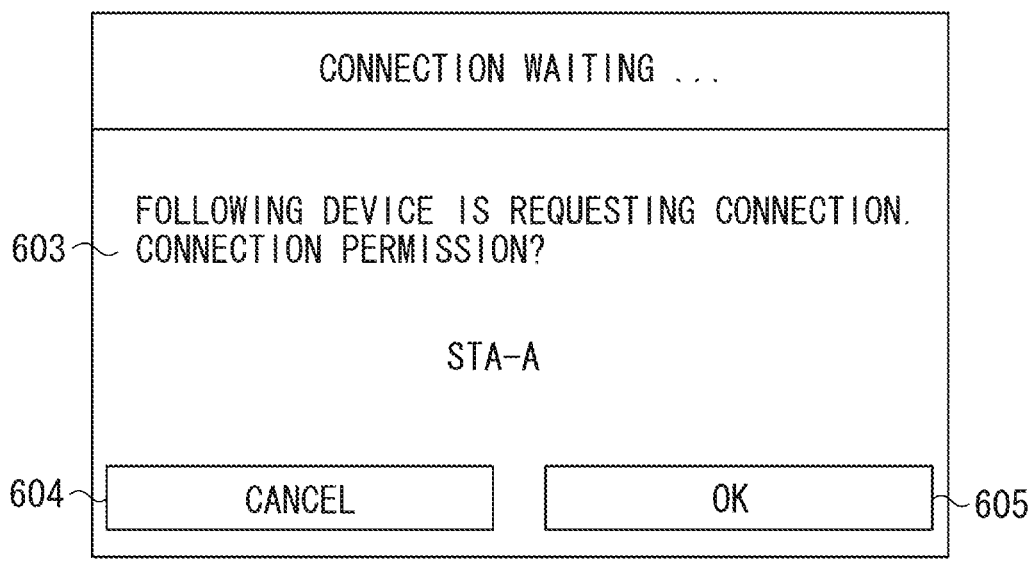

When, in step F407, the STA-B receives the connection request from the STA-A, the STA-B displays a screen on the display unit 105 for determining whether the connection from the STA-A is permitted. A display example is illustrated in FIG. 6B. A device name 603 of which connection request has been transmitted is displayed. If, in step F408, the STA-B permits the connection, connection permission 605 is selected, and if the STA-B refuses the connection, connection refusal 604 is selected.

If, in step F409, the connection permission 605 is selected on the STA-B, the STA-B transmits a connection response to the STA-A.

A display screen illustrated in FIG. 6B is a mere example. When, in step F407, the STA-B receives the connection request, the STA-B may automatically transmit the connection response in step F409. Thus, the operation of displaying screen may be omitted in the STA-B.

Then, the STA-A recognizes that the STA-B provides a desired service, and executes connection processing in the wireless layer in step F410 and predetermined connection processing defined in the extended service in step F411. According to the present exemplary embodiment, an example in which the connection processing is executed in the wireless layer after service search is described. However, the connection processing of the wireless layer may be executed in advance, and only service connection processing in step F411 may be executed.

The connection processing in the wireless layer is performed based on the Wi-Fi direct specification described above. More specifically, one of the STA-A and the STA-B becomes the P2P group owner, and the other becomes the P2P client. The CL participates in the wireless network established by the GO to perform connection.

In step F412, service processing is executed between the STA-A and the STA-B after the connection processing is completed.

<Connection Between STA-a and STA-C>

Next, a processing flow when the STA-A is connected to the STA-C in the standard service is described with reference to FIG. 4B.

Steps F401 to F405 are similar to those of FIG. 4A. Therefore, the description thereof will be omitted.

When the STA-A receives a search response signal, the STA-A displays a list of apparatuses, which have transmitted the search response signal, on the display unit 105. A display example is illustrated in FIG. 6A. The STA-B (601) and the STA-C (602) of which search response signal have been received are displayed on the display unit 105. In step F413, according to the operation sequence illustrated in FIG. 4B, the user operates the operation unit 109 to select the device STA-C (602) to be connected.

Since the STA-C supports only the standard service, in step F414, the STA-A transmits a connection request in a standard service to the STA-C.

When, in step F414, the STA-C receives the connection request from the STA-A, the STA-C displays a screen on the display unit 105 for determining whether the connection from the STA-A is permitted. A display example is illustrated in FIG. 6B. A device name 603, which has transmitted the connection request, is displayed. If, in step F408, the STA-C permits the connection, the connection permission 605 is selected, and if the STA-C refuses the connection, the connection refusal 604 is selected.

If, in step F415, the connection permission 605 is selected on the STA-C, the STA-C transmits a connection response to the STA-A.

A display screen of FIG. 6B is a mere example. When, in step F404, the STA-C receives the connection request, the STA-C may automatically transmit the connection response in step F415. Thus, the operation of displaying screen may be omitted in the STA-C.

Then, the STA-A recognizes that the STA-C provides a desired service. Thereby, in step F410, the STA-A performs connection processing in the wireless layer in the same manner as in that illustrated in FIG. 4A, and in step F416, executes predetermined connection processing defined in the standard service. According to the present exemplary embodiment, an example in which the connection processing in the wireless layer is executed after service search is described. However, the connection processing of the wireless layer may be executed in advance, and only service connection processing in step F416 may be executed.

The connection processing in the wireless layer is performed based on the Wi-Fi direct specification described above. More specifically, one of the STA-A and the STA-C becomes the P2P group owner, and the other becomes the P2P client. The CL participates in the wireless network established by the GO to perform connection.

In step F417, the service processing is executed between the STA-A and the STA-C after the connection processing is completed.

<Device Connection Processing>

Figure 5:
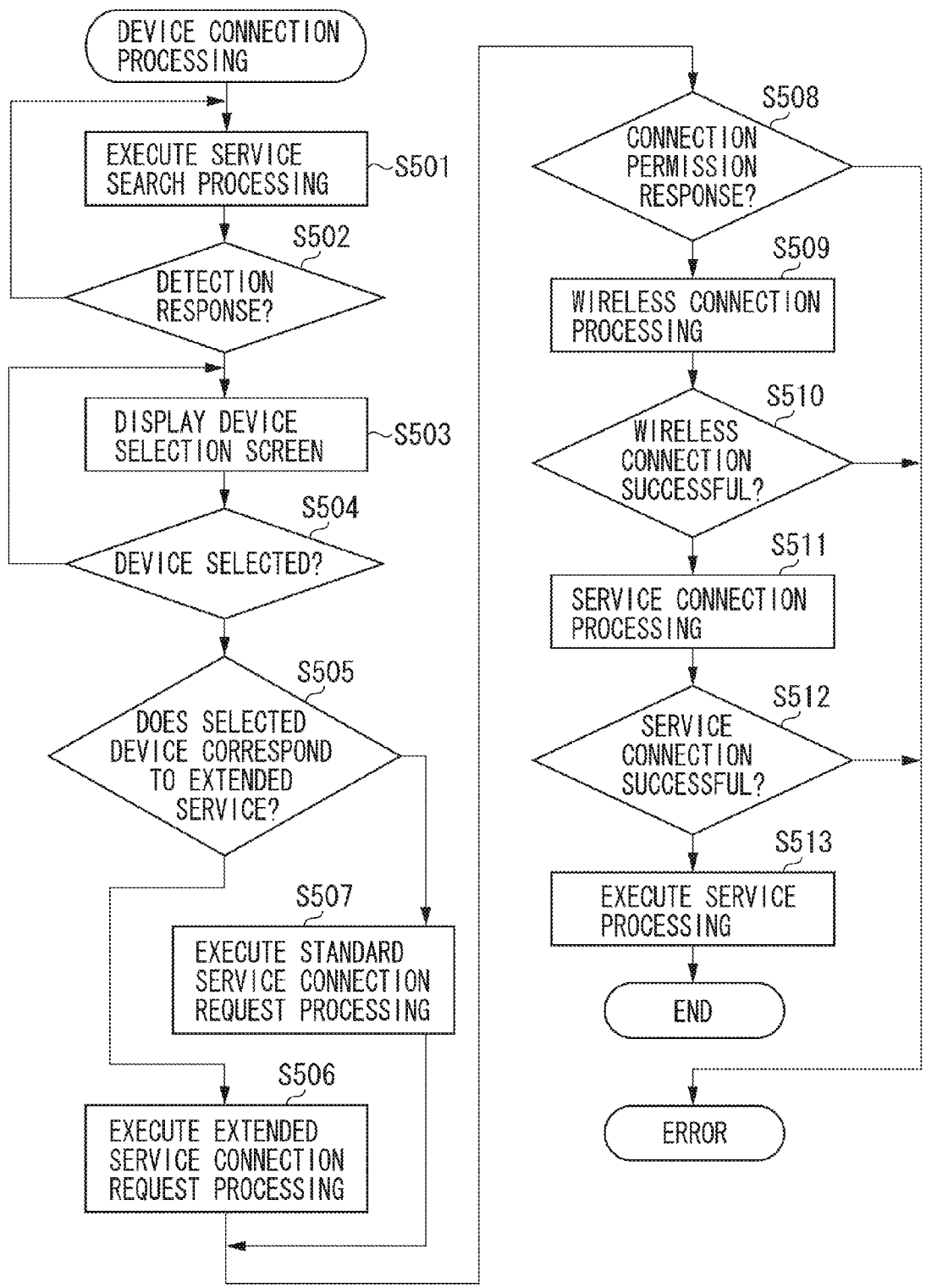
FIG. 5 is a flowchart illustrating an operation procedure of the apparatus according to the first exemplary embodiment.

FIG. 5 is a flow chart illustrating an operation of the STA-A according to the present exemplary embodiment. Each step of the present flow chart is realized by the control unit 102 of the communication apparatus 101 that controls each unit of the communication apparatus 101 according to an input signal and a program stored in the storage unit 103.

When, in step F401, a search start operation is executed, the control unit 102 of the STA-A starts device connection processing.

In step S501, the control unit 102 executes service search processing. Since the STA-A supports both the standard service and the extended service, the control unit 102 transmits search packets for both of the services.

In step S502, the control unit 102 determines whether a detection response packet has been received. When the control unit 102 determines that the control unit 102 receives the detected response packet (YES in step S502), the processing proceeds to step S503. The control unit 102 displays a device selection screen, and stores a type of the provided service in the storage unit 103. When the control unit 102 determines that the detected response packet has not been received (NO in step S502), the processing proceeds to step S501. Then, the control unit 102 performs the service search processing.

In step S503, the control unit 102 displays a list of devices of which detected response packet have been received on the display unit 105, and the processing proceeds to step S504. Then, the control unit 102 waits for the selection of a connection device by the user. In step S503, the control unit 102 may collectively display information indicating which device supports which of the standard service and the extended service, with the list of the devices of which detected response packet have been received.

In step S504, the control unit 102 determines whether the user has selected the device to be connected. If the control unit 102 determines that the user has selected the device to be connected (YES in step S504), the processing proceeds to step S505. If the control unit 102 determines that the user has not selected the device to be connected (NO in step S504), the processing proceeds to step S503, and the control unit 102 displays a list of the devices on the display unit 105.

In step S505, the control unit 102 determines whether the device selected in step S504 supports the extended service. The control unit 102 determines whether the selected device supports the extended service, by referring to the service type stored in the storage unit 103 in step 502. If the control unit 102 determines that the selected device supports the extended service (YES in step S505), the processing proceeds to step S506. Then the control unit 102 executes extended service connection request processing. If the control unit 102 determines that the selected device does not support the extended service (NO in step S505), the processing proceeds to step S507. Then, the control unit 102 executes standard service connection request processing. The STA-A and the STA-B support both the standard service and the extended service. Therefore, The STA-A and the STA-B can be connected to each other in either services. In this case, the STA-A according to the present exemplary embodiment gives a priority to a high-function extended service having an extended function, and automatically selects the extended service. Alternatively, priority between the standard service and the extended service for connection may also be set in the menu of the communication apparatus 101. If a dedicated application supporting the extended service is incorporated in the communication apparatus 101, it is possible to connect to the extended service preferentially.

In step S506, the control unit 102 executes the extended service connection request processing to the apparatus selected in step 504. Then, the processing proceeds to step S508, and the control unit 102 waits for the reception of a connection permission response.

In step S507, the control unit 102 executes the standard service connection request processing to the apparatus selected in step 504. Then, the processing proceeds to step S508, and the control unit 102 waits for the reception of the connection permission response.

In step S508, the control unit 102 determines whether the connection permission response has been received. If the control unit 102 determines that the connection permission response has been received (YES in step S508), the processing proceeds to step S509. If the control unit 102 determines that the connection permission response has not been received (NO in step S508), the control unit 102 determines the operation as an error, and ends the device connection processing.

In step S509, the control unit 102 executes wireless connection processing, and the processing proceeds to step S510. Then the control unit 102 waits for the completion of the wireless connection. The connection processing in the wireless layer is performed based on the Wi-Fi direct specification described above. More specifically, any one of STA-A and STA-B becomes the P2P group owner, and the other becomes the P2P client. The CL participates in the wireless network established by the GO to perform connection.

In step S510, the control unit 102 determines whether the wireless connection processing has been successful. If the control unit 102 determines that the wireless connection processing has been successful (YES in step S510), the processing proceeds to step S511. If the control unit 102 determines that the wireless connection processing has been failed (NO in step S510), the control unit 102 determines the operation as an error, and ends the device connection processing.

In step S511, the control unit 102 executes the service connection processing, and the processing proceeds to step S512. Then, the control unit 102 waits for the completion of the service connection processing. A unique connection method may be used for the service connection processing in the standard service and the extended service.

In step S512, the control unit 102 determines whether the service connection processing has been successful. If the control unit 102 determines that the service connection processing has been successful (YES in step S512), the processing proceeds to step S513. If the control unit 102 determines that the service connection processing has been failed (NO in step S512), the control unit 102 determines the operation as an error, and ends the device connection processing.

In step S513, the control unit 102 executes the service processing. In a case where the service is the printing service, the service processing is processing for, for example, setting of a printing parameter or transmission of printing data. In a case where the service is the file transmitting service, the service processing is processing for, for example, transmission of the image file. A unique processing method may be used for the service processing in the standard service and the extended service.

Additional embodiments can also be realized by a computer of a system or apparatus that reads out and executes computer executable instructions recorded on a storage medium (e.g., computer-readable storage medium) to perform the functions of one or more of the above-described embodiment(s), and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-077781 filed Apr. 3, 2013, which is hereby incorporated by reference herein in its entirety.

What is claimed is:

1. A communication apparatus comprising:
   a connection unit configured to connect to an external apparatus via a wireless network, wherein the connection of the connection unit is processing on a first communication layer;
   a utilizing unit configured to utilize a service provided by the external apparatus after connecting to the wireless network, wherein the service is utilized on a second communication layer that is higher than the first communication layer after the connection on the first communication layer is performed;
   a search unit configured to search for the external apparatus providing at least one service, prior to connecting to the wireless network on the first communication layer;
   a determination unit configured to determine a service provided by the external apparatus searched for by the search unit; and
   a transmission unit configured to transmit a request for utilizing the service of the external apparatus on the second communication layer to the searched external apparatus, prior to connecting to the wireless network on the first communication layer,
   wherein, if it is determined that an external apparatus to be communicated with provides a standard service and an extended service is provided, the transmission unit transmits a request to the external apparatus for utilizing the extended service,
   wherein, if it is determined that an external apparatus to be communicated with provides the standard service but not the extended service, the transmission unit transmits a request to the external apparatus for utilizing the standard service, and
   wherein, when the request for utilizing the extended service or the standard service is accepted, the connection unit connects to the wireless network and then the utilizing unit configured to utilize the accepted service.

2. The communication apparatus according to claim 1, further comprising:
   a specification unit configured to specify a function to be searched by the search unit,
   wherein, when a predetermined function is specified by the specification unit, the search unit searches for the external apparatus providing at least one of the standard service for providing the predetermined function and the extended service for providing the predetermined function.

3. The communication apparatus according to claim 1, wherein the search unit searches for the external apparatus providing at least one of the standard service and the extended service by transmitting a search command including information indicating the standard service and the extended service.

4. The communication apparatus according to claim 1, wherein the search unit searches for the external apparatus providing at least one of the standard service and the extended service by individually transmitting a search command including information indicating the standard service and a search command including information indicating the extended service.

5. The communication apparatus according to claim 1, further comprising:
- a display unit configured to display a list of the external apparatuses searched by the search unit; and
- a selection unit configured to, based on the list, select the external apparatus with which the communication apparatus is to communicate,
- wherein the transmission unit transmits the request for utilizing the service of the external apparatus selected by the selection unit.

6. The communication apparatus according to claim 1, further comprising:
- a setting unit configured to set a priority of the service,
- wherein, when the determination unit determines that the searched external apparatus can provide the standard service and the extended service, the external apparatus with which to communicate is determined based on the priority set by the setting unit.

7. A method for controlling a communication apparatus, the method comprising:
- searching for an external apparatus providing at least one service, prior to connecting to a wireless network on a first communication layer;
- determining a service provided by the searched external apparatus;
- transmitting a request for utilizing the service of the external apparatus on a second communication layer to the searched external apparatus, prior to connecting to the wireless network on the first communication layer,
- wherein, if it is determined that an external apparatus to be communicated with provides a standard service and an extended service, transmitting a request to the external apparatus for utilizing an extended service,
- wherein, if it is determined that an external apparatus to be communicated with provides the standard service but not the extended service, transmitting a request to the external apparatus for utilizing the standard service;
- connecting, when the request for utilizing the extended service or the standard service is accepted, to the wireless network, wherein the connection is processing on the first communication layer; and
- utilizing the accepted service provided by the external apparatus after connecting to the wireless network, wherein the service is utilized on the second communication layer that is higher than the first communication layer after the connection on the first communication layer is performed.

8. A non-transitory computer-readable storage medium storing computer executable instructions that cause a computer to execute the method of claim 7.

* * * * *